(12) United States Patent
Lee et al.

(10) Patent No.: US 9,674,503 B2
(45) Date of Patent: Jun. 6, 2017

(54) STEREO MATCHING APPARATUS USING IMAGE PROPERTY

(71) Applicant: LG INNOTEK CO., LTD., Seoul (KR)

(72) Inventors: Jun Seo Lee, Seoul (KR); Jeong Mok Ha, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 126 days.

(21) Appl. No.: 14/430,270

(22) PCT Filed: Sep. 25, 2013

(86) PCT No.: PCT/KR2013/008533
§ 371 (c)(1),
(2) Date: Mar. 23, 2015

(87) PCT Pub. No.: WO2014/051309
PCT Pub. Date: Apr. 3, 2014

(65) Prior Publication Data
US 2015/0281672 A1    Oct. 1, 2015

(30) Foreign Application Priority Data
Sep. 26, 2012 (KR) .................. 10-2012-0106997

(51) Int. Cl.
*G06K 9/00* (2006.01)
*H04N 13/02* (2006.01)
(Continued)

(52) U.S. Cl.
CPC ..... *H04N 13/0203* (2013.01); *G06K 9/00214* (2013.01); *G06K 9/6201* (2013.01);
(Continued)

(58) Field of Classification Search
CPC ......... G06T 7/0075; G06T 2207/10012; G06T 2207/10021; G06T 7/0022; G06T 7/0024;
(Continued)

(56) References Cited

U.S. PATENT DOCUMENTS

2002/0025075 A1    2/2002  Jeong et al.
2004/0151380 A1    8/2004  Jeong et al.
(Continued)

OTHER PUBLICATIONS

Ohta, Yuichi, and Takeo Kanade. "Stereo by intra-and inter-scanline search using dynamic programming." IEEE Transactions on pattern analysis and machine intelligence 2 (1985): 139-154.*
(Continued)

*Primary Examiner* — Li Liu
(74) *Attorney, Agent, or Firm* — Saliwanchik, Lloyd & Eisenschenk

(57) ABSTRACT

A stereo matching apparatus is provided, where according to the stereo matching apparatus according to an exemplary embodiment of the present disclosure, a cost at nodes of a plurality of stages relative to an image of a current scan line is determined by which level among a same level, an upper level and a lower level of a previous stage a cost of same stage of an upper scan line is determined, and whether a cost of the same stage of the upper scan line is determined by other disparities.

8 Claims, 3 Drawing Sheets

(51) Int. Cl.
  *G06K 9/62*     (2006.01)
  *G06T 7/593*    (2017.01)
  *H04N 13/00*    (2006.01)

(52) U.S. Cl.
  CPC .... *G06T 7/593* (2017.01); *G06T 2207/10012* (2013.01); *G06T 2207/20076* (2013.01); *H04N 13/0239* (2013.01); *H04N 2013/0074* (2013.01); *H04N 2013/0081* (2013.01)

(58) Field of Classification Search
  CPC ............ G06T 2207/20076; G06K 9/32; G06K 9/00214; G06K 9/6201; H04N 13/0239; H04N 2013/0081; H04N 2013/0074; H04N 13/0203
  See application file for complete search history.

(56) References Cited

U.S. PATENT DOCUMENTS

| | | | |
|---|---|---|---|
| 2005/0078865 A1* | 4/2005 | Criminisi | G06T 7/0022 382/154 |
| 2005/0078866 A1* | 4/2005 | Criminisi | G06T 7/0022 382/154 |
| 2009/0315976 A1 | 12/2009 | Jeong et al. | |
| 2011/0091096 A1 | 4/2011 | Morris et al. | |
| 2012/0163703 A1 | 6/2012 | Lim et al. | |

OTHER PUBLICATIONS

International Search Report in International Application No. PCT/KR2013/008533, filed Sep. 25, 2013.

\* cited by examiner

Fig. 4
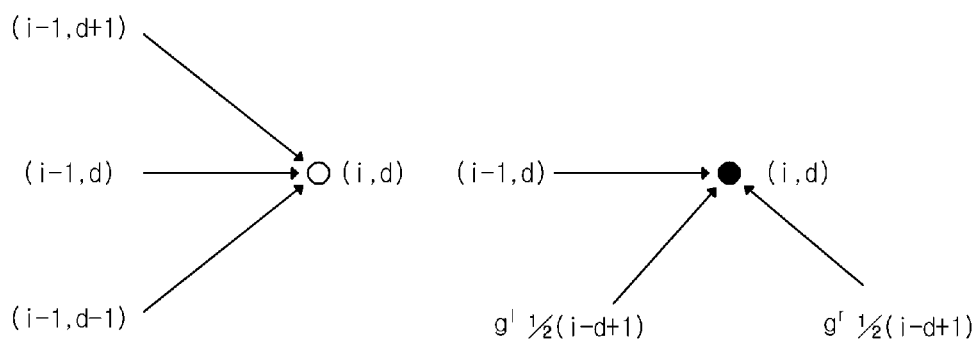
(a)Occlusionnode    (a)Matchingnode
Fig. 5
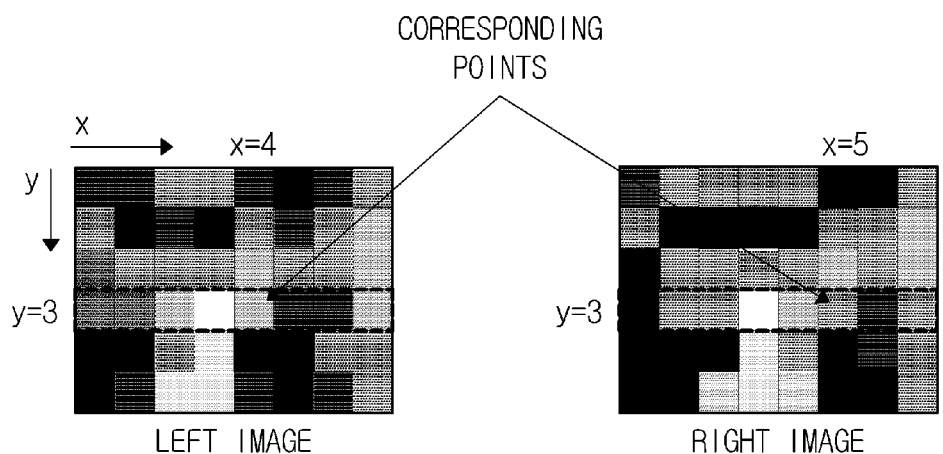
Fig. 6a

STEREO MATCHING APPARATUS USING IMAGE PROPERTY

CROSS-REFERENCE TO RELATED APPLICATIONS

This application is the U.S. national stage application of International Patent Application No. PCT/KR2013/008533, filed Sep. 25, 2013, which claims priority to Korean Application No. 10-2012-0106997, filed Sep. 26, 2012, the disclosures of each of which are incorporated herein by reference in their entirety.

TECHNICAL FIELD

Exemplary aspects of the present disclosure relate to a stereo matching apparatus using image property.

BACKGROUND ART

In general, a computer vision is a field that includes methods for acquiring, processing, analyzing, and understanding images, where a technical method for acquiring distance information using images is called a stereo vision.

In a stereo system using two cameras, it is important to find corresponding points between a left image and a right image, which is called a stereo matching, a process of finding corresponding points between two offset images of the same scene. That is, the stereo matching is to find the most similar corresponding points when all pixels of a left image are compared with pixels of right image. A distance can be determined if corresponding points are found.

Various stereo matching methods are available, and a trellis is a representative one. The trellis is one of stereo matching finding a distance of an object through a matching process using a stereo image. The trellis is advantageous over other methods due to less computing amount, but disadvantageous due to decreased accuracy. The disadvantage of the trellis represented by a streak noise is generated by comparison of pixels by a line of left/right images when the stereo matching is performed.

DISCLOSURE OF INVENTION

Technical Problem

It is an object of the present disclosure to provide a stereo matching apparatus using image property configured to improve distance accuracy by removing streak noise, in a case pixels of left and right images are compared by each line in a stereo matching system.

Solution to Problem

In one general aspect of the present disclosure, there may be provided a stereo matching apparatus, the apparatus comprising: an extractor configured to extract a scan line relevant to a corresponding point in a stereo image; a first determiner configured to determine a cost at a node of a plurality of stages relative to an image of a current scan line depending on from which level among a same level, an upper level and a lower level of a previous stage a cost of same stage of an upper scan line is determined, and whether a cost of the same stage of the upper scan line is determined by other disparities; a designator configured to designate a path in response to the determined cost; and a second determiner configured to determine a path that minimizes energy at the designated path.

In some exemplary of the present invention, the apparatus may further comprise a stereo camera unit configured to acquire a stereo image.

In some exemplary of the present invention, the first determiner may be configured to determine the cost by adding a cost of the same level at the previous stage to its own cost, in case of matching node of the current scan line.

In some exemplary of the present invention, the first determiner may be configured to determine a first mismatching parameter when the cost of the same stage at the upper scan line is determined from the upper level of the previous stage, and a second mismatching parameter dissimilar to the first mismatching parameter when the cost of the same stage at the upper scan line is determined from the lower level of the previous stage, in case of a mismatching node of the current scan line.

In some exemplary of the present invention, the first determiner may be further configured to decrease the first mismatching parameter to a predetermined scope when the cost of the same stage at the upper scan line is determined by other disparities, and by the upper level of the previous stage, and decreases the second mismatching parameter to a predetermined scope when the cost of the same stage at the upper scan line is determined by the lower level of the previous stage.

In some exemplary of the present invention, the second determiner may be configured to determine as the cost of a corresponding node a minimum value at the current scan line among a value in which a cost of the same level of the previous stage, a value in which a cost of the upper level is added by the reduced first mismatching parameter, and a value in which a cost of the lower level is added by the reduced second mismatching parameter.

In some exemplary of the present invention, the designator may be configured to designate a path corresponding to 1 when the cost is determined by a cost of the upper level, a path corresponding to 0 when the cost is determined by a cost of the same level, and a path corresponding to −1 when the cost is determined by a cost of the lower level.

In some exemplary of the present invention, the second determiner may be configured to determine a disparity to minimize energy.

In some exemplary of the present invention, the apparatus may further comprise a storage configured to store the path determined by the second determiner.

Advantageous Effects of Invention

The stereo matching apparatus according to an exemplary embodiment of the present disclosure has an advantageous effect in that a mismatching parameter can be individually designated during cost determination depending on whether transition at an upper scan line is generated from a upper level or a lower level using an image property, and matching accuracy can be increased by calculating a trellis by reducing a corresponding mismatching parameter, in a case the transition is generated from the upper scan line.

BRIEF DESCRIPTION OF DRAWINGS

FIG. 4 is an exemplary view illustrating a cost at each path relative to a matching node and an occlusion node, where a black spot defines a matching node, and a white spot defines an occlusion node.

FIG. 5 is an exemplary view of a stereo image acquired by using a stereo camera unit according to an exemplary embodiment of the present disclosure.

FIGS. 6a to 6d are exemplary views illustrating a stereo matching by a trellis method of image in FIG. 5.

FIG. 7 is a block diagram illustrating a stereo matching apparatus according to an exemplary embodiment of the present disclosure.

BEST MODE FOR CARRYING OUT THE INVENTION

Advantages and features of the present disclosure may be understood more readily by reference to the following detailed description of exemplary embodiments and the accompanying drawings. Thus, the present disclosure is not limited to the exemplary embodiments which will be described below, but may be implemented in other forms. Accordingly, the described aspect is intended to embrace all such alterations, modifications, and variations that fall within the scope and novel idea of the present disclosure.

The stereo matching apparatus according to an exemplary embodiment of the present disclosure may be applicable to a dynamic programming algorithm including a trellis. However, although the stereo matching apparatus according to an exemplary embodiment of the present disclosure has explained an application to trellis, for convenience sake, it should be obvious to the skilled in the art that application to other dynamic programming algorithms is not ruled out.

Now, a conventional trellis will be first explained and then a stereo matching apparatus according to an exemplary embodiment of the present disclosure will be described with reference to the accompanying drawings.

Figure 1:
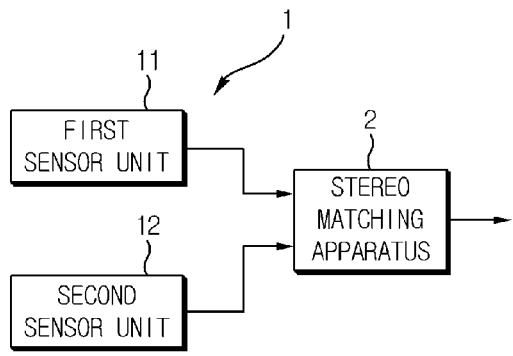
FIG. 1 is a schematic block diagram illustrating a stereo system according to an exemplary embodiment of the present disclosure.

FIG. 1 is a schematic block diagram illustrating a stereo system according to an exemplary embodiment of the present disclosure.

Referring to FIG. 1, a stereo system according to an exemplary embodiment of the present disclosure comprises a stereo camera unit (1) and a stereo matching apparatus (2).

The stereo camera unit (1) comprises a first sensor unit (11) and a second sensor unit (12). The first sensor unit (11) and the second sensor unit (12) are mutually spaced apart at a predetermined distance to respectively acquire one of stereo images. For example, the first sensor unit (11) may acquire a left image and the second sensor unit (12) may acquire a right image. Alternatively, the first sensor unit (11) may acquire a right image and the second sensor unit (12) may acquire a left image. In the exemplary embodiment of the present disclosure, explanation will be made on a configuration in which an image obtained by the first sensor unit (11) is a left image and an image obtained by the second sensor unit (12) is a right image, for convenience sake.

The first and second sensor units (11 and 12) may be a camera sensor such as a CCD (Charge Coupled Device) sensor, or a CMOS (Complementary Metal-Oxide Semiconductor) sensor, but the present disclosure is not limited thereto, and may be any other devices that perform similar functions.

The stereo matching apparatus (2) receives a stereo image from the stereo camera unit (1), and performs the stereo matching thereto using a trellis.

Hereinafter, explanation will be made on a trellis, and then a stereo matching apparatus according to an exemplary embodiment of the present disclosure that has improved a conventional trellis will be described.

First, explanation will be made on a relation between a binocular disparity d and a 3D (three dimensional) distance Z will be made. The stereo matching is to re-construct a 3D space from a 2D left image and a 2D right image, where corresponding points are acquired from the two 2D images to estimate 3D information using a mutual geometric relationship.

In order to estimate 3D information using the mutual geometric relationship by finding corresponding points from two 2D images, it is important to find a point corresponding to a point of an image at one side (reference image) from the stereo image, from an image at the other side (corresponding image), where the point is located on an epipolar line of a corresponding image relative to the point on the reference image, and a stereo matching can be performed by inspecting only two horizontally spread single scan lines, if calibration to the epipolar line is performed.

Figure 2:
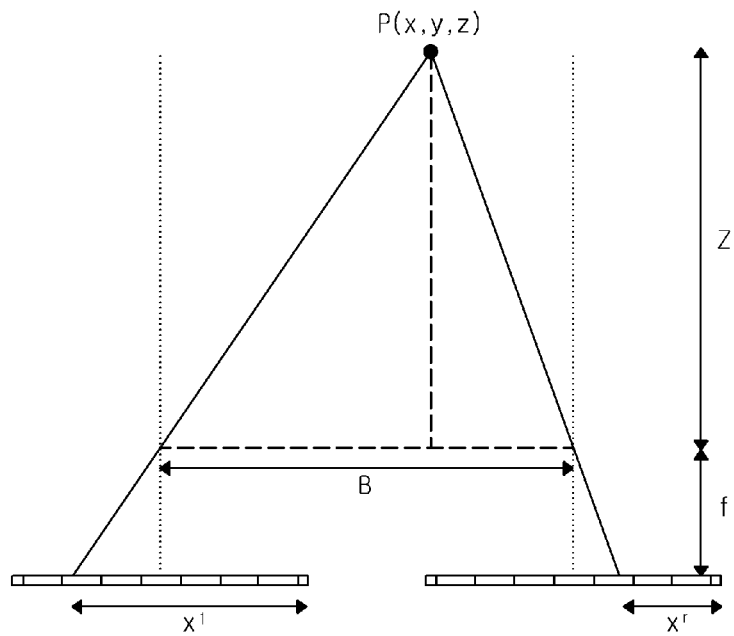
FIG. 2 is an exemplary view illustrating a relationship between binocular disparity and 3D information.

FIG. 2 is an exemplary view illustrating a relationship between binocular disparity and 3D information, where relationship between left and right images acquired from the stereo camera unit (1) and an object captured on the images is illustrated.

A binocular disparity d relative to each corresponding pixel may be expressed as in the following equation as a corresponding point on a single line.

MathFigure 1

$$d = x^r - x^l \qquad \text{[Math.1]}$$

where, d defines a binocular disparity, xr defines a length of x axis on a right image and xl defines a length of x axis on a left image. It can be noted that a relationship as in the following equation is established from a geometric structure if one point P(x, y, z) is photographed as a left image and a right image.

MathFigure 2

$$x^r - x^l : f = B : Z \qquad \text{[Math.2]}$$

where, f is a focal length, B (base length) is a distance between two cameras, and Z is a 3D distance, where the following equation may be provided if the equation 2 is applied to the equation 1.

MathFigure 3

$$Z = \frac{fB}{d} \qquad \text{[Math. 3]}$$

That is, the abovementioned equation 3 can estimate 3D information of an object, i.e., a depth if the focal length and a distance (B) between and two cameras are found and a corresponding point between two images is found.

A first sensor unit (11) and a second sensor unit (12) of the stereo camera unit (1) store a 3D image in 2D discrete components to allow an observed image to be expressed in discrete points.

Figure 3:
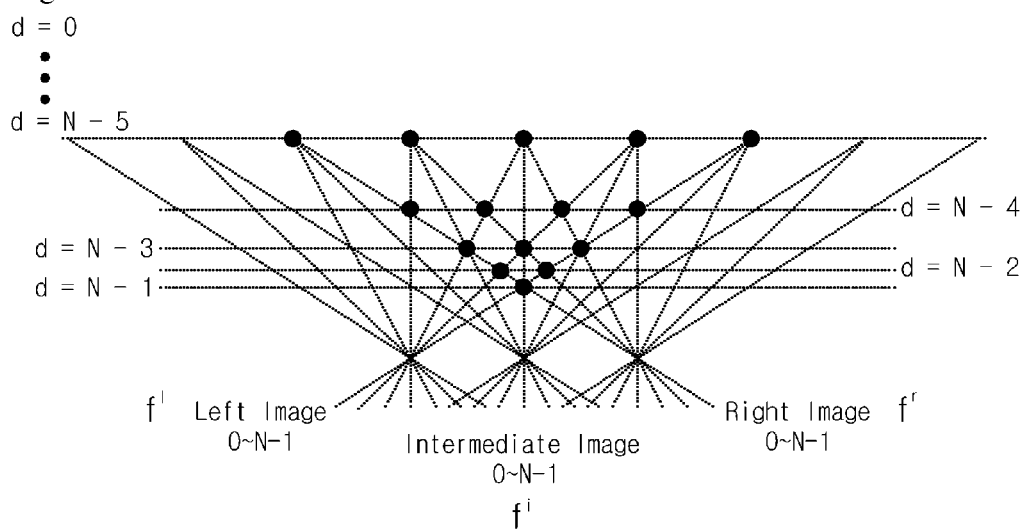
FIG. 3 is an example illustrating binocular disparity by discrete component at a left image and a right image.

FIG. 3 is an example illustrating binocular disparity by discrete component at a left image and a right image.

Referring to FIG. 3, a binocular disparity can be expressed by the discrete components from the observed left image and right image, A binocular disparity of a point farthest distanced from an image is 0 (d=0, i.e., z is infinite), such that it can be noted that all contact points on same line has same binocular disparity, and the binocular disparity decreases as a 3D depth (Z, 3D distance) increases.

Furthermore, a black spot in FIG. 3 is a node where matching occurs for a 3D coordinate to verify surface perception of an object, the node may be defined by a point where a projection lines meet, and a pixel of two images that meet at the node is formed by a pair, if an appropriate matching occurs at a certain node, which is called a matching node. Conversely, an area may exist where, although a surface of an object may be visible from one image of two images, the surface of the object may not be visible from the other image side, and the area is called an occlusion node.

As illustrated in FIG. 3, one projection line at the left side meets a plurality of projection lines at the right side, where a correct matching occurs only at a matching node meeting only one projection line among the plurality of projection lines at the right side. As noted above, if a restriction is provided from the relationship among the projection lines to which images are projected, the number of to-be-searched-paths may decrease to increase computation efficiency and to reduce computation.

The stereo matching technique is based on a MAP (Maximum A Posteriori) estimation configured to find a binocular disparity that minimizes energy function. To this end, an optimum path is searched using a viterbi algorithm based on a DP (dynamic programming). That is, a method may be performed where a path is defined at a matching node and an occlusion node, costs given to each path are added, and a path where the costs are minimized is detected.

FIG. 4 is an exemplary view illustrating a cost at each path relative to a matching node and an occlusion node, where a black spot defines a matching node, and a white spot defines an occlusion node.

If a current stage is 'i', a minimumable path is defined as a minimum value among sums of costs of paths from a minimum value to 'i−1' stage to path from 'i−1' stage to 'i' stage.

In an occlusion node, a path is formed (a) by designating a minimum value between a value in which a cost of same level of previous state is added by mismatching parameter of cost of upper level, and a value in which a cost of lower level is added by a mismatching parameter. Meanwhile, in matching node, a path is formed by a node of same level of previous stage added by its own node value (b). At this time, in matching node, pixel values of left and right images are required to calculate a cost that is defined as a matching cost.

An optimum path exists between the matching nodes and occlusion nodes, and a result comes out in which a matching cost and an occlusion cost are allocated to the path, for example. Furthermore, a stage is related to a time in a lattice structure, where one stage is defined by lengthwise-lined nodes of a path from left to right.

In order to apply the abovementioned trellis method, the following restrictive conditions are provided.

First, a position of an object existing on a left image cannot be farther right than a position of an object existing on a right image, and second, a value between a first binocular disparity d0 and a last binocular disparity d2N is zero (0), and a difference between di and di−1 cannot exceed 1.

An algorithm configured to search for an optimal path is as under, where a cost $\delta$ of all nodes at stage i=0 is initialized as in the following equation, and where the reason of repeated and respective performance to a forward direction along 'i=1, ... , 2N' is to acquire an optimal path and an optimal cost from the allocated binocular disparity d and each node.

MathFigure 4

$$\delta(0, j) = \begin{cases} 0 & j = 0 \\ \infty & \text{otherwise} \end{cases} \quad [\text{Math. 4}]$$

Meanwhile, if 'i+d' is an even number, it refers to an occlusion node, and a cost and optimal disparity $\psi$ at occlusion node may be expressed in the following equation.

MathFigure 5

$$\delta(i,j) = \min_{\alpha \in [-1,1]} \delta(i-1, j+\alpha) + \gamma\alpha^2 \quad [\text{Math. 5}]$$

$$\psi(i,j) = \arg \min_{\alpha \in [-1,1]} \delta(i-1, j+\alpha) + \gamma\alpha^2$$

If 'i+d' is an odd number, it refers to a matching node, where a cost and optimal disparity $\psi$ at matching node may be expressed in the following equation.

MathFigure 6

$$\delta(i,j) = \delta(i-1, j) + |f^l(\tfrac{1}{2}(i-j+1)) - f^r(\tfrac{1}{2}(i+j+1))| \quad [\text{Math.6}]$$

If 'i' is '2N', and T is '0', a forward repeated computation is finished and an initial value of a backward direction (cost and optimal disparity) is determined as in the following equation.

MathFigure 7

$$\delta = \delta(2N, O) \quad [\text{Math.7}]$$

$$\psi = \psi(2N, O)$$

Thereafter, an optimal disparity may be acquired by performing a backward recursive search to a backward direction of stage as in the following equation 8.

MathFigure 8

$$\psi(i-1) = \psi(i) + \psi(i, \psi(i)), \quad [\text{Math. 8}]$$

where, $\gamma$ is a mismatching parameter satisfying the equation 5, size of an image is defined by M×N.

The above methods are exemplified using an actual image. FIG. 5 is an exemplary view of a stereo image acquired by using a stereo camera unit (1) according to an exemplary embodiment of the present disclosure, and FIGS. 6a to 6d are exemplary views illustrating a stereo matching by a trellis method of image in FIG. 5.

One line (y=3 in left image, and y=3 line at right image) corresponding to a stereo image in FIG. 5 is extracted to calculate a brightness difference of all pixels.

A left upper side in FIG. 6a is expressed as (0, 0) for convenience sake. The 0th horizontal line and 7th horizontal line are all 99, where '99' is provided as a value instead of infinite for convenience sake.

1, 0, 0, 8, 9, 4 in (1,1), (2,2), . . . , (6,6) are differences between 14 of first value of right image and (13, 14, 14, 22, 23, 10) of left image. 8, 8, 0, 1, 12 of next diagonal lines (1,3), (2,4), . . . , (6,8) are differences between 22 of second value of right image and (14, 14, 22, 23, 10) of left image. Using the above methods and calculating pixel differences, storage may be made by calculating pixel differences using the above methods as in FIG. 6a.

Figures 6B, 6C, 6D, 7:
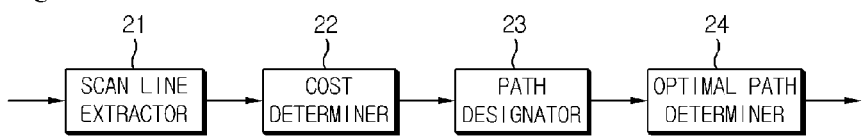

FIG. 6b is completed by the abovementioned method with reference to FIG. 4, using a result of FIG. 6a. That is, in case of occlusion node (tone of the matching node is lighter than that of occlusion node), comparison is made between a cost of same level of previous stage and a value of costs of upper and lower levels added by mismatching parameter, and a minimum value between the two is stored. Furthermore, in case of matching node, a cost of same level of previous stage is stored with its own node value as a cost.

That is, in case of occlusion node, a total of three costs (cost of same disparity of previous frame and cost of disparity by each one) is compared to find a smallest value, and a cost is sought from a current frame relative to the value, where if it is determined that it is not the same disparity (i.e., if it is not a cost of same level), a mismatching parameter is added as a penalty.

The trellis is a matter of energy minimization, and in a case all are added, and if an energy-smallest path is found, it is none other than a depth of an image. The term of 'energy being the smallest' is that a brightness difference of left/right images is the smallest, which means that a most-similarly matched value is a path where energy is smallest.

A value of most extreme right side in FIG. 6b is 29, and 29 and 22 are present at a left side thereof. '22' is selected, because a path having a smaller value between '29' and '22' must be selected.

FIG. 6c explains which path each node value of FIG. 6b comes from. '0' is stored if a valued stored in a corresponding node comes from the same level of previous stage, '1' is stored if the value comes from a lower level of previous stage, and '−1' is stored if the value comes from an upper level.

FIG. 6d is an exemplary view illustrating a process of finding a disparity configured to minimize energy using a path of FIG. 6c. A dark grey portion in FIG. 6d means a path configured to minimize energy, and a portion therebelow means a disparity of a corresponding path. The disparity may be found by moving values stored in the path to the left side, starting from zero (0), and adding a corresponding value thereto.

Hereinafter, a stereo matching apparatus according to an exemplary embodiment of the present disclosure configured to improve the abovementioned trellis method will be described.

First, characteristic of an image will be explained for the exemplary embodiment of the present disclosure.

The stereo camera unit (1) is realized to express several pixels, if one object is photographed. Hence, surrounding pixels based on one pixel have similar pixel values, the notion of which is due to the fact that colors within one object are similar, and one object appears over several pixels. If this theory is applied to a trellis, disparities of pixels of four sides (left, right, upper and lower sides) are mutually similar based on one pixel. This characteristic of an image is applied to the trellis in the exemplary embodiment of the present disclosure.

FIG. 7 is a block diagram illustrating a stereo matching apparatus according to an exemplary embodiment of the present disclosure in which a detailed configuration of a stereo matching apparatus (2) of FIG. 1 is illustrated.

Referring to FIG. 7, the stereo matching apparatus (2) according to an exemplary embodiment of the present disclosure may comprise a scan line extractor (21), a cost determiner (22), a path designator and an optimal path determiner (24).

The scan line extractor (21) extracts a line relevant to corresponding points from a stereo image received from a stereo camera unit (1). The examples of extracted lines are illustrated as in FIGS. 6a and 6b. In the explanation according to an exemplary embodiment of the present disclosure, a current scan line extracted by the scan line extractor (21) is referred to as 'a relevant scan line", and a scan line extracted from previous time is referred to as "an upper scan line". This is because the stereo matching is generally performed from an uppermost scan line.

The cost determiner (22) respectively determines costs of matching node and occlusion node relative to pixels of lines extracted by the scan line extractor (21). In case of matching node, determination is made by adding its own cost to a cost of same level of previous stage.

In the exemplary embodiment of the present disclosure, in the occlusion node, a method dissimilar to the conventional trellis method is used. That is, the conventional trellis for occlusion node is a method in which comparison is made between a cost of same level of previous stage and a value in which costs of upper level and lower level are added by mismatching parameter, and determination is made on a minimum value between the two.

However, in the exemplary embodiment of the present disclosure, the cost determiner (22) performs a trellis in which, using the characteristic of an image explained above, a determination is made on whether a cost of same stage of upper scan line has come from a same level of previous stage, has come from an upper level or has come from a lower level, a respectively individual mismatching parameter is provided thereto, and size of mismatching parameter of relevant scan line is reduced according to occurrence of transition (i.e., whether cost of same stage has come from different disparity in the upper scan line). In a case the transition has occurred in the upper scan line, there may be also a high probability of transition occurring at a relevant scan line to enhance the matching accuracy.

That is, in a case the cost of same stage at the upper scan line has come from the same level of previous stage, there is no application of mismatching parameter, and in a case the cost of same stage at the upper scan line has come from an upper level of the previous stage, and has come from a lower level of the previous stage, a first mismatching parameter and a second mismatching parameter are respectively determined as a mismatching parameter at the relevant scan line.

The cost determiner (22) in the exemplary embodiment of the present disclosure decreases the first mismatching parameter, in a case the cost of same stage at the upper scan line has come from the upper level of the previous stage, because transition has occurred when the cost of same stage at the upper scan line in the occlusion node has come from different disparity, and decreases the second mismatching parameter in a case the cost of same stage at the upper scan line has come from the lower level of the previous stage. At this time, decreased degrees of the first and second mismatching parameters may be determined by system set-up.

Successively, the cost determiner (22) according to an exemplary embodiment of the present disclosure may compare between values in which the first mismatching parameter is added by a cost of same level of previous stage and a cost of upper level, and a value in which the second mismatching parameter is added by cost of lower level, and stores a lesser value among the three values as a minimum value.

Referring to FIG. 6d, the path designator (23) may designate a path based on the determined cost using the determined cost. A path corresponding to '1' may be designated when a cost is determined by a cost of upper level, a path corresponding to '0' may be designated when a cost is determined by a cost of same level, or a path corresponding to '−1' may be designated when a cost is determined by a cost of lower level. The stereo matching apparatus according to an exemplary embodiment of the present disclosure may further include storage (not shown) to store the path thus determined.

The optimal path determiner (24) determines an optimal path configured to minimize energy on a path designated by the path designator (23). That is, the optimal path determiner (24) determines a disparity configured to minimize the energy. The process of finding the optimal path and disparity is same as what is explained in FIG. 6d.

Although exemplary embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

The invention claimed is:

1. A stereo matching apparatus, the apparatus comprising:
a scan line extractor configured to extract a scan line including a current scan line and an upper scan line relevant to a corresponding point in a stereo image including an image of the current scan line;
a cost determiner configured to determine a cost at a node of a plurality of stages relative to the image of the current scan line, the determination depending on from which level among a same level, an upper level, and a lower level of a previous stage a cost of same stage of the upper scan line is determined, and whether a cost of the same stage of the upper scan line is determined by other disparities;
a path designator configured to designate a path in response to the determined cost; and
an optimal path determiner configured to determine a path that minimizes energy at the designated path.

2. The apparatus of claim 1, wherein the cost determiner is configured to determine the cost by adding a cost of the same level at the previous stage to its own cost, in case of a matching node of the current scan line.

3. The apparatus of claim 1, wherein the cost determiner is configured to determine a first mismatching parameter when the cost of the same stage at the upper scan line is determined from the upper level of the previous stage, and a second mismatching parameter dissimilar to the first mismatching parameter when the cost of the same stage at the upper scan line is determined from the lower level of the previous stage, in case of a mismatching node of the current scan line.

4. The apparatus of claim 3, wherein the cost determiner is further configured to decrease the first mismatching parameter to a predetermined scope when the cost of the same stage at the upper scan line is determined by other disparities, and by the upper level of the previous stage, and decrease the second mismatching parameter to a predetermined scope when the cost of the same stage at the upper scan line is determined by the lower level of the previous stage.

5. The apparatus of claim 4, wherein the optimal path determiner is configured to determine a minimum value as the cost of a corresponding node at the current scan line among a value in which a cost of the same level of the previous stage, a value in which a cost of the upper level added by the reduced first mismatching parameter, and a value in which a cost of the lower level added by the reduced second mismatching parameter.

6. The apparatus of claim 1, wherein the path designator is configured to designate a path corresponding to 1 when the cost is determined by a cost of the upper level, a path corresponding to 0 when the cost is determined by a cost of the same level, and a path corresponding to −1 when the cost is determined by a cost of the lower level.

7. The apparatus of claim 1, wherein the optimal path determiner is configured to determine a disparity to minimize energy.

8. The apparatus of claim 1, further comprising:
a storage configured to store the path determined by the optimal path determiner.

* * * * *